United States Patent
Hsieh et al.

(10) Patent No.: US 9,977,722 B2
(45) Date of Patent: May 22, 2018

(54) CABINET TYPE ON-SITE MONITORING DEVICE AND MONITORING METHOD THEREOF

(71) Applicant: CyberPower Systems, Inc., Taipei (TW)

(72) Inventors: Hung-Ming Hsieh, Taipei (TW); Hung-Chun Chien, Taipei (TW); Yung-Hao Peng, Taipei (TW)

(73) Assignee: CYBERPOWER SYSTEMS, INC., Taipei (TW)

( * ) Notice: Subject to any disclaimer, the term of this patent is extended or adjusted under 35 U.S.C. 154(b) by 423 days.

(21) Appl. No.: 14/572,333

(22) Filed: Dec. 16, 2014

(65) Prior Publication Data

US 2016/0170857 A1   Jun. 16, 2016

(51) Int. Cl.
*G06F 11/30* (2006.01)
*G06F 11/32* (2006.01)

(52) U.S. Cl.
CPC ...... *G06F 11/3044* (2013.01); *G06F 11/3058* (2013.01); *G06F 11/3065* (2013.01); *G06F 11/324* (2013.01)

(58) Field of Classification Search
CPC .......................... G06F 11/3044; G06F 11/3058
See application file for complete search history.

(56) References Cited

U.S. PATENT DOCUMENTS

| | | | | |
|---|---|---|---|---|
| 5,929,762 | A * | 7/1999 | Missimer, Jr. | G08B 17/00 340/584 |
| 9,706,137 | B2 * | 7/2017 | Scanlon | H04N 5/33 |
| 2006/0087777 | A1 * | 4/2006 | Bruno | G01R 21/06 361/38 |
| 2010/0044567 | A1 * | 2/2010 | Brandt | G01J 5/0096 250/334 |
| 2010/0073013 | A1 * | 3/2010 | Zeller | G01R 31/3277 324/551 |
| 2011/0074382 | A1 * | 3/2011 | Patel | G01R 15/207 324/76.11 |
| 2014/0197165 | A1 * | 7/2014 | Korcz | H02G 3/10 220/3.9 |

* cited by examiner

*Primary Examiner* — Jermele M Hollington
*Assistant Examiner* — Feba Pothen
(74) *Attorney, Agent, or Firm* — Muncy, Geissler, Olds & Lowe, P.C.

(57) ABSTRACT

The present disclosure illustrates a cabinet type on-site monitoring device, which comprises a monitoring module and a positioning mechanism, and monitoring method thereof. The monitoring module can automatically detect an electric apparatus installed inside a cabinet for monitoring, and a main body can be combined on a casing structure, or the casing structure is movably pivoted on a cabinet door by using a positioning component and hang holes or a through hole on a support. Manager can watch the monitoring device via window or directly to look over current operation status of respective electric apparatus without opening the cabinet door. A sound or visible warning action is performed when the monitoring module automatically detects and gets real-time status data of any of electric apparatus exceeding a setting normal range, so as to increase convenience and flexibility of on-site immediate management, and keep the electric apparatus operate more efficiently.

10 Claims, 8 Drawing Sheets

CABINET TYPE ON-SITE MONITORING DEVICE AND MONITORING METHOD THEREOF

BACKGROUND OF THE INVENTION

1. Field of the Invention

The present disclosure relates to a cabinet type on-site monitoring device and monitoring method thereof, more particularly to a monitoring device which is combined on a cabinet by a positioning mechanism, and a sound or visible warning action is performed when the monitoring device automatically detects current operation status of any of electric apparatuses exceeding a setting normal range, so as to increase convenience of on-site immediate management by a manager, and keep more efficient operation of the electric apparatus.

2. Description of the Related Art

Currently, information industry is developed rapidly and extended throughout various businesses including personal workstation type computer group, computer facilities of telecommunication companies, private enterprise and government entities. The information apparatuses are applied widely and deeply, at the same time, technologies of computing power and data storage of the computer are kept improving, under operations of the information apparatuses with high density, a mass of electric power must be provided to drive main bodies of the information apparatuses on the one hand, and other electric power must be provided to a cooling system on the other hand, to maintain the information apparatuses to operate more efficiently.

However, as the density of the information apparatuses in the computer facilities becomes higher, the performance of the processor becomes more powerful, the using rate of the cabinet for telecommunication or communication becomes higher. Many electronic devices or apparatuses are disposed inside the cabinet, such as computer or server, storage system apparatus (such as network attached storage system, diskette array, etc.), computer peripheral apparatus (such as modem, exchanger or router, etc.) or other information apparatus, so air-conditioning temperature, humidity, or fire control security monitoring (such as flood or fire damage) at the inside or the peripheral environment of the cabinet for telecommunication or communication must be maintained in a normal status, to ensure the stable operations of the electronic devices or the apparatuses.

Moreover, apart from the information apparatuses, other apparatuses with different functions such as communication, power supply, environment detection and air-conditioning, are installed inside the general cabinet for telecommunication or communication to maintain the normal operation of each of the apparatuses, or transmit the information measured by these apparatuses. Each of the apparatuses is usually designed to have a monitoring interface, for example light signal of light emitting diode (LED), liquid crystal displayer (LCD), a buzzer, a button, etc., to transmit the measuring signal or warning signal based on the information measured on-site, to the manager or provide function of the control apparatus to the manager. Each of apparatuses has different monitor interface, when the number of the apparatuses within the cabinet is increased, the inconvenience and difficulty of management for the manager may be efficiently increased due to lack of consistency between the on-site monitoring interfaces. In addition, the network is developed rapidly, more and more apparatuses installed in the cabinet for telecommunication or communication adopt wired or wireless network interfaces. Although the network interface can provide function of remote and integrated management, the manager must use an extra computer or a control apparatus as central controller to monitor the operation statuses of the apparatuses within the cabinet, and it is not easy to directly display the measured information on the monitoring interface on-site. Therefore, the manager lacks the flexibility of on-site real-time management. Moreover, this network remote management not only requires an extra computer or a control apparatus for implementation, but the manager also must set the apparatus to be added into management by himself/herself for using the cabinet integrated management, and it increases the inconvenience of on-site management for the manager. What is need in this industry is to solve the above-mentioned problems.

SUMMARY OF THE INVENTION

An aspect of the present disclosure is to provide a cabinet type on-site monitoring device and monitoring method thereof, to solve problems of inconvenience and difficulty of management caused by the apparatuses within the cabinet for telecommunication or communication has different monitor interfaces, and by the network remote management requiring an extra computer or a control apparatus for implementation.

Main objective of the present disclosure directs to the monitoring device equipped with a monitoring module inside a main body thereof and a positioning mechanism outside the main body thereof, the monitoring module can automatically detect the electric apparatus installed inside a cabinet for monitoring, and the main body can be combined on a casing structure of the cabinet, or the casing structure is movably pivoted on a cabinet door by using a positioning component to insert the plurality of hang holes of the positioning mechanism or the through hole on a support, so that the manager can watch the monitoring device via the window or directly to check the current operation status of each of electric apparatuses without opening the cabinet door. The monitoring module can also automatically detect, search and get the real-time status data of the electric apparatuses. A sound or visible warning action is performed when the monitoring module determines the real-time status data of any of electric apparatuses exceeding a setting normal range. The monitoring device can provide the manager a single interface for on-site monitoring different electric apparatuses, so as to increase convenience of on-site real-time management by a manager, and the product can be more competitive.

Other objective of the present disclosure directs to the monitoring module of the monitoring device having a control unit which is connected to a storage unit having a network interface, and connected to a sound output unit, a display module and an input unit respectively. When determining the real-time status data of any of electric apparatuses exceeding a setting normal range, the control unit controls the sound output unit to broadcast a corresponding sound, or the display module to display corresponding data, pattern or light signal, for a warning action. When determining the real-time status data of the electric apparatus not exceeding the setting normal range and the warning action is not needed, the control unit can control the display module to display the real-time status data of the 1~N electric apparatuses sequentially.

Another objective of the present disclosure directs to the storage unit of the monitoring module prestoring the media access control addresses of the management information base files of supportable apparatuses and a manufacturer relationship table. When the input unit of the control unit generates a trigger, the control unit sequentially sends the address resolution protocol packet according to the inputted internet protocol range stored in storage unit to each of electric apparatuses until an internet protocol address which not recorded returns a response packet for this packet of address resolution protocol, The control unit then parses the response packet of address resolution protocol returned by this new internet protocol address, to get a media access control address in the source of the address resolution protocol packet, and then search the manufacturer corresponding to the media access control address from the manufacturer relationship table. Next, the control unit searches the management information base file corresponding to the manufacturer from the storage unit, and arbitrarily selects an object identifier in each of apparatuses contained the management information base file, one by one, and then conveys a simple network management protocol packet based on the selected object identifier to the electric apparatus on this internet protocol address until the electric apparatus returns the response packet, and the electric apparatus is then determined to be a kind of the apparatus of the manufacturer, and this internet protocol address is recorded. The extra computer or control apparatus is not required between the monitoring device and these electric apparatuses, that is, the local area network can be used as an interface for data transmission and communication, so the inconvenience in the integrated management for the manager to set the electric apparatus to be added into management can be avoided. In addition, complicated wiring and connection operation is not needed after the electric apparatus is installed inside the cabinet, so it is not necessary to buy a new monitoring device for automatically detecting and searching real-time status data of electric apparatuses for monitoring even if the electric apparatus is upgraded or a new electric apparatus is added.

Another objective of the present disclosure directs to the input unit of the monitor module providing the manager to touch to generate and output a control signal to the control unit, when the control unit determines to get the instruction from the input unit for conveying a control action to the electric apparatus, the control unit then sends the command to the electric apparatus via the network interface, so the manager can on-site operate related setting or control function for the electric apparatus by touching the input unit, and the whole operation is more direct and convenient.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
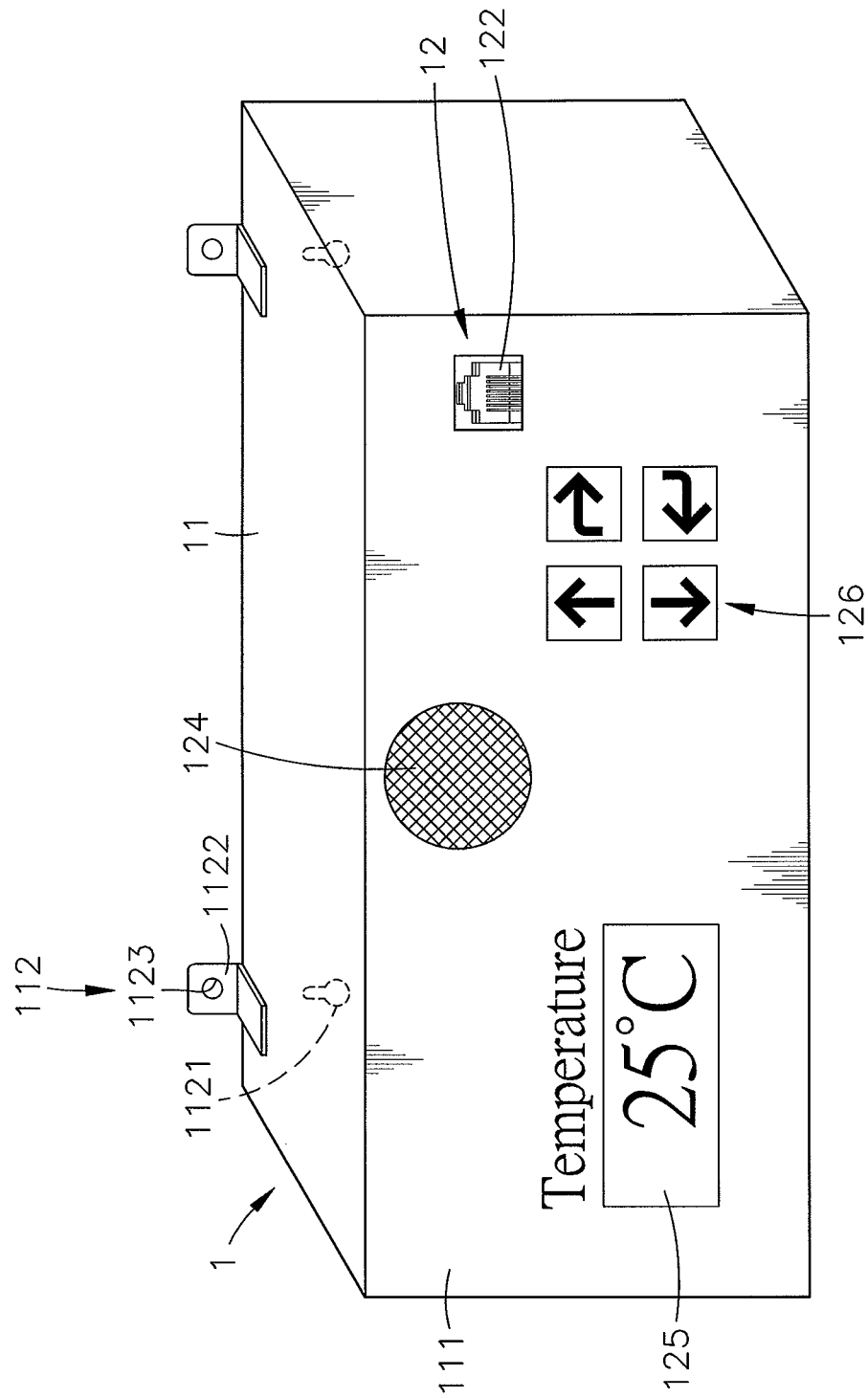
FIG. 1 is a perspective appearance view of a monitoring device of the present disclosure.
Figure 2:
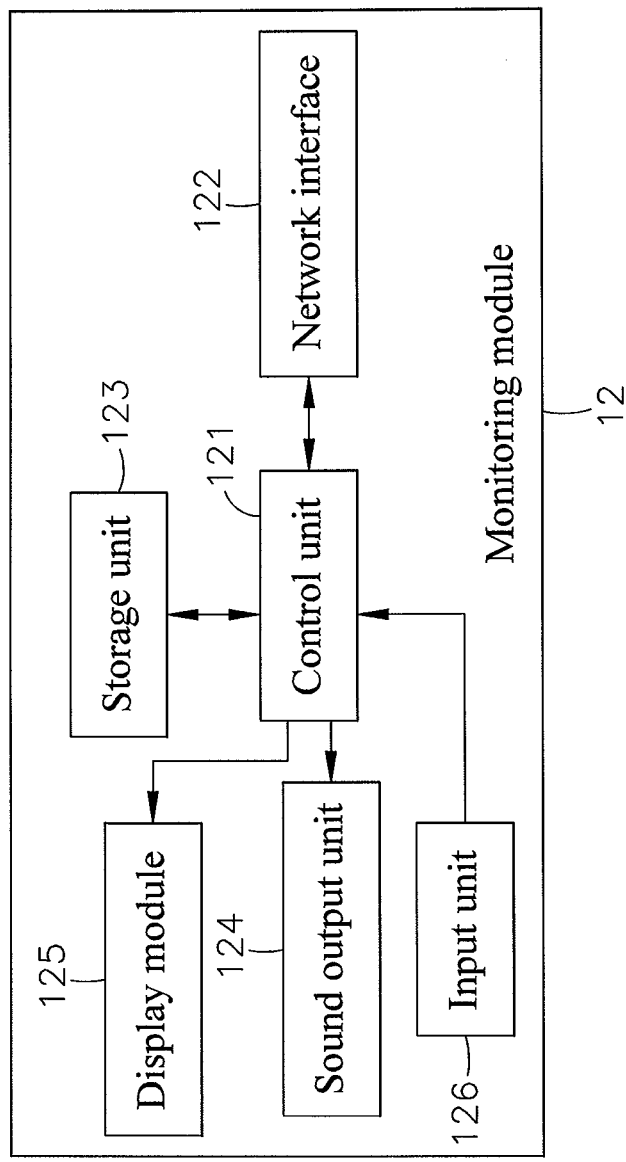
FIG. 2 is a block diagram of the monitoring device of the present disclosure.
Figure 3:
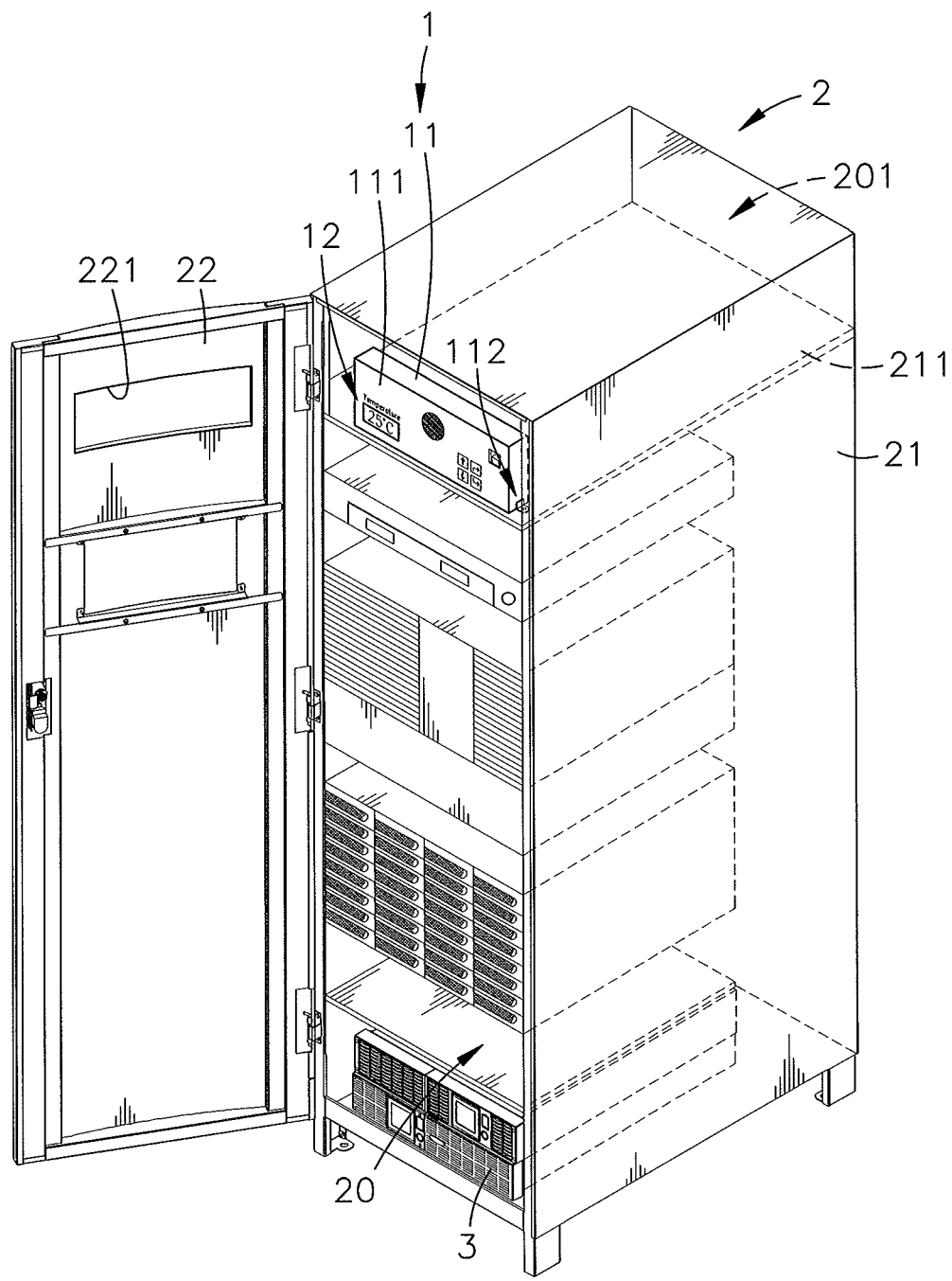
FIG. 3 is a perspective appearance view of a preferred embodiment of the present disclosure.
Figure 4:
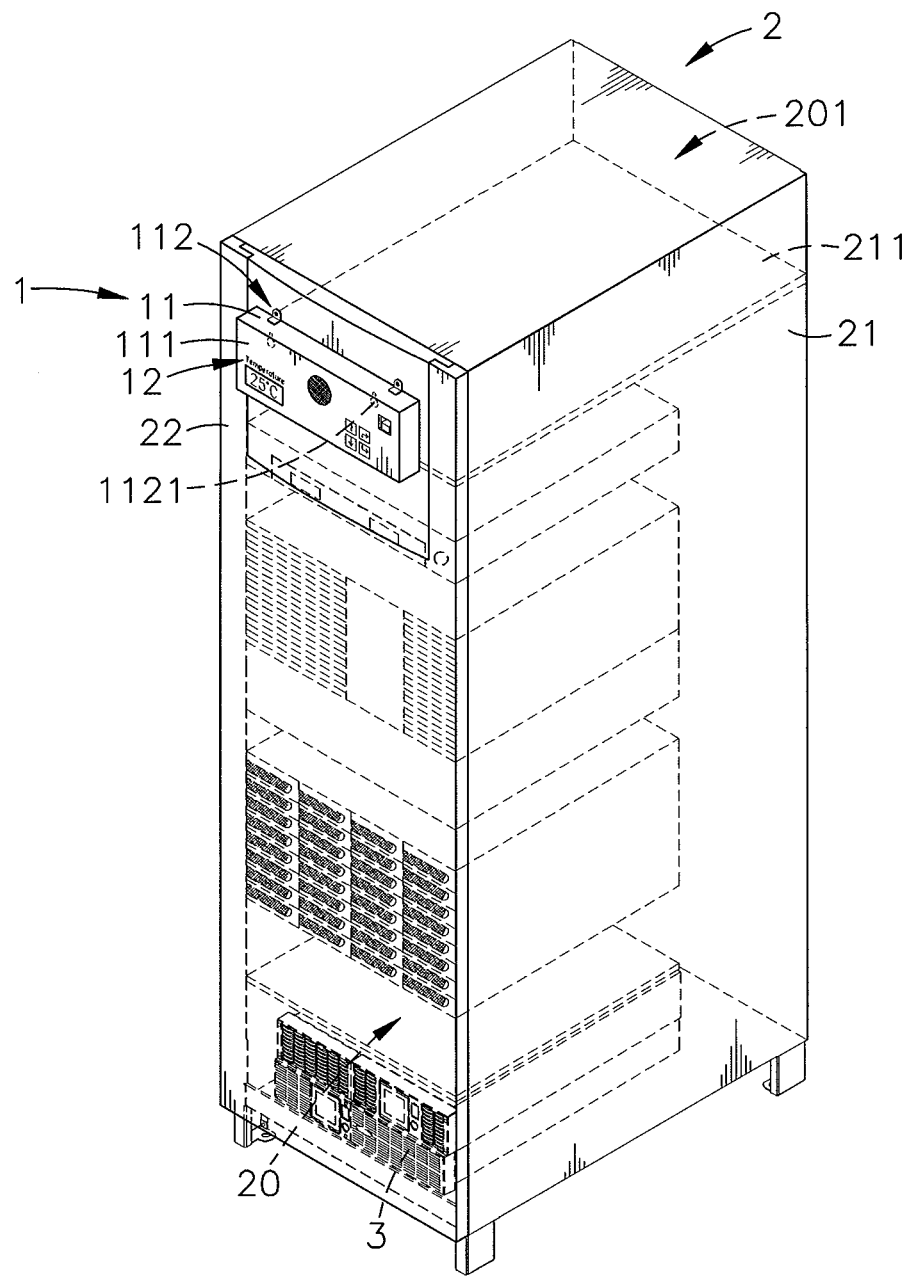
FIG. 4 is a perspective appearance view of another preferred embodiment of the present disclosure.
Figure 5:
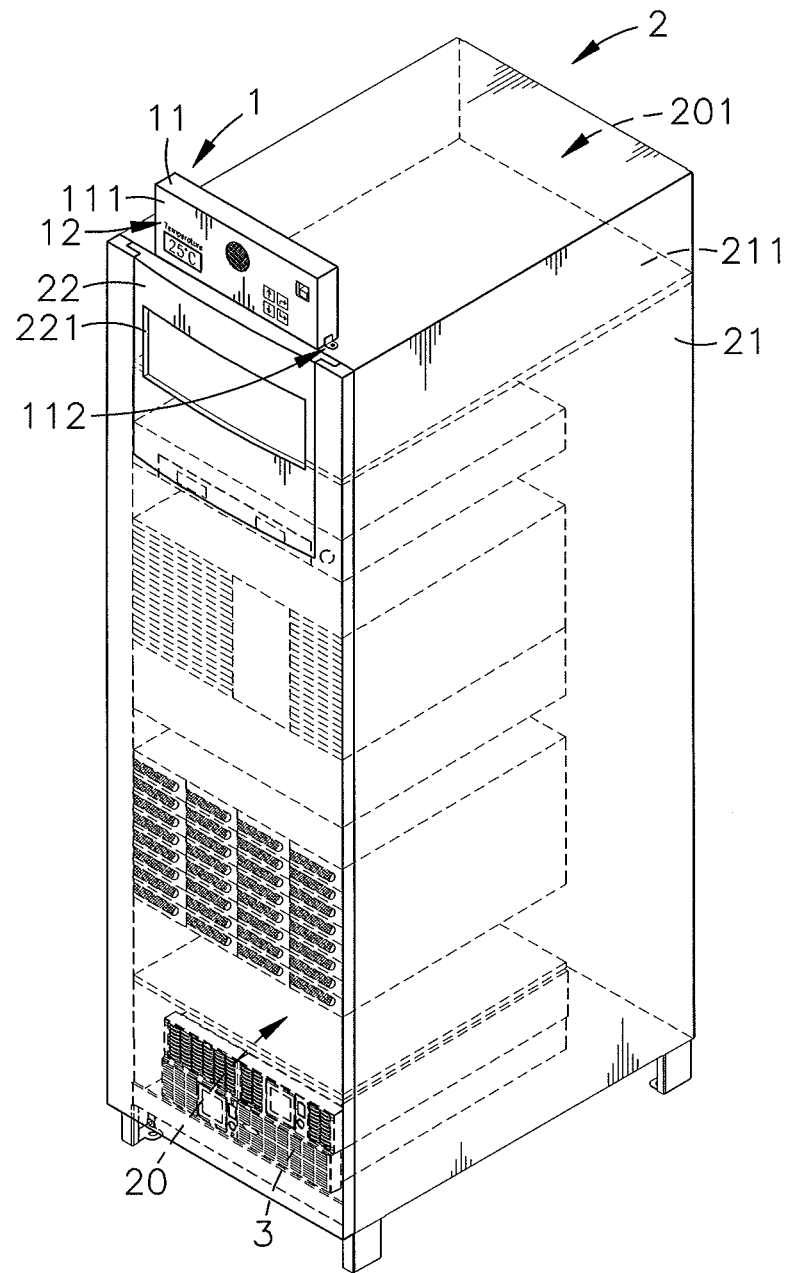
FIG. 5 is a perspective appearance view of another preferred embodiment of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 through FIG. 5, which are perspective appearance view and block diagram of a monitoring device of the present disclosure, and perspective appearance views of a preferred embodiment, other preferred embodiment and another preferred embodiment of the present disclosure. As shown in FIGS., the present disclosure comprises a monitoring device 1. The monitoring device 1 includes a main body 11 which is equipped with a monitoring module 12 at the inside thereof, and a panel 111 at the front thereof, and a positioning mechanism 112 at the outside thereof. Preferably, the positioning mechanism 112 has a plurality of hang holes 1121 and at least one L shaped support 1122 disposed on a back side or a top side of the main body 11, respectively, and each of at least one support has a through hole 1123 for being inserted by a positioning component (not shown in FIGS.). However, in practical application, the structure type or number of the positioning mechanism 112 can be changed upon usage requirement or different structural design.

Moreover, the monitoring module 12 includes a control unit 121 which can be a micro controller (MCU), a central processor (CPU) or other processor. The control unit 121 is connected to a storage unit 123 for storing predetermined data and a network interface 122. The storage unit 123 can be an EEPROM or flash memory. The control unit 121 is further respectively connected to a sound output unit 124, a display module 125 and an input unit 126 which are on the panel 111 of the main body 11, and the sound output unit 124 of the monitoring module 12 can be a buzzer or a loudspeaker, the display module 125 can be at least one LED or liquid crystal displayer, and the input unit 126 can be a touch control panel or a plurality of buttons.

The monitoring device 1 of the present disclosure can be applied on a cabinet 2, and used in cooperation with an electric apparatus 3 installed inside the cabinet 2. The cabinet 2 comprises a casing structure 21 and a cabinet door 22 movably pivoted at a front opening of the casing structure 21, and an accommodating space 20 is formed inside the casing structure 21 and the cabinet door 22. A plurality of clapboards 211 are used to separate the accommodating space 20 to form multiple positioning spaces 201 overlaid for installing at least one electric apparatus 3, and the cabinet door 22 has a window 221. The electric apparatus 3 can be a server, a storage system apparatus (such as network attached storage system, disk array, etc.), a computer peripheral apparatus (such as modem, exchanger or router, etc.) or other information apparatus. The electric apparatus 3 is built in or connected to a monitoring module having a network interface (not shown in FIGS.), to facilitate the monitoring module 12 of the monitoring device 1 to connect with the monitoring module of the electric apparatus 3 via network for automatically detecting and monitoring.

During assembly, the monitoring device 1 is directly placed inside the positioning space 201 of the casing structure 21 and corresponds to the window 221 of the cabinet door 22. The cabinet door 22 is then closed to the opening of the casing structure 21, and the window 221 of the cabinet door 22 corresponds to the display module 125 of the monitoring device 1. However, in practical application, the main body 11 of the monitoring device 1 can be hanged on a corresponding hook (not shown in FIGS.) on a wall surface of the cabinet door 22, or a positioning component (such as screw, stud, etc.) can be used to insert a through hole 1123 on the support 1122 and then be combined and positioned on the wall surface of the cabinet door 22 by manner of screwing or riveting, so that the main body 11 can be disposed on the inner side of the window 221 of the cabinet door 22. After the cabinet door 22 is closed up the casing structure 21, the monitoring device 1 can be accommodated in the accommodating space 20 of the casing structure 21 and not exposed, to enable the manager to on-site watch the display information on the monitoring device 1 via the window 221 without opening the cabinet door 22.

However, the main body 11 of the monitoring device 1 being directly placed inside the casing structure 21 of the cabinet 2, or disposed on the wall surface of the cabinet door 22 by using the hang hole 1121 of the positioning mechanism 112 or support 1122, to enable the window 221 to correspond to the display module 125 of the monitoring device 1 after the cabinet door 22 is closed up, is just a preferred embodiment, and the claim scope of the present disclosure is not limited thereto. The main body 11 of the monitoring device 1 can also be disposed on the top or two sides of the casing structure 21, or outer surface of the cabinet door 22 or other appropriate position by using the positioning mechanism 112, so as to provide the manager to directly watch the display module 125 of the monitoring device 1, or watch the display module 125 of the monitoring device 1 via the window 221 of the cabinet door 22 without opening the cabinet door 22, and check the current operation status of respective electric apparatus 3 according to the display information on the display module 125.

Figure 6:
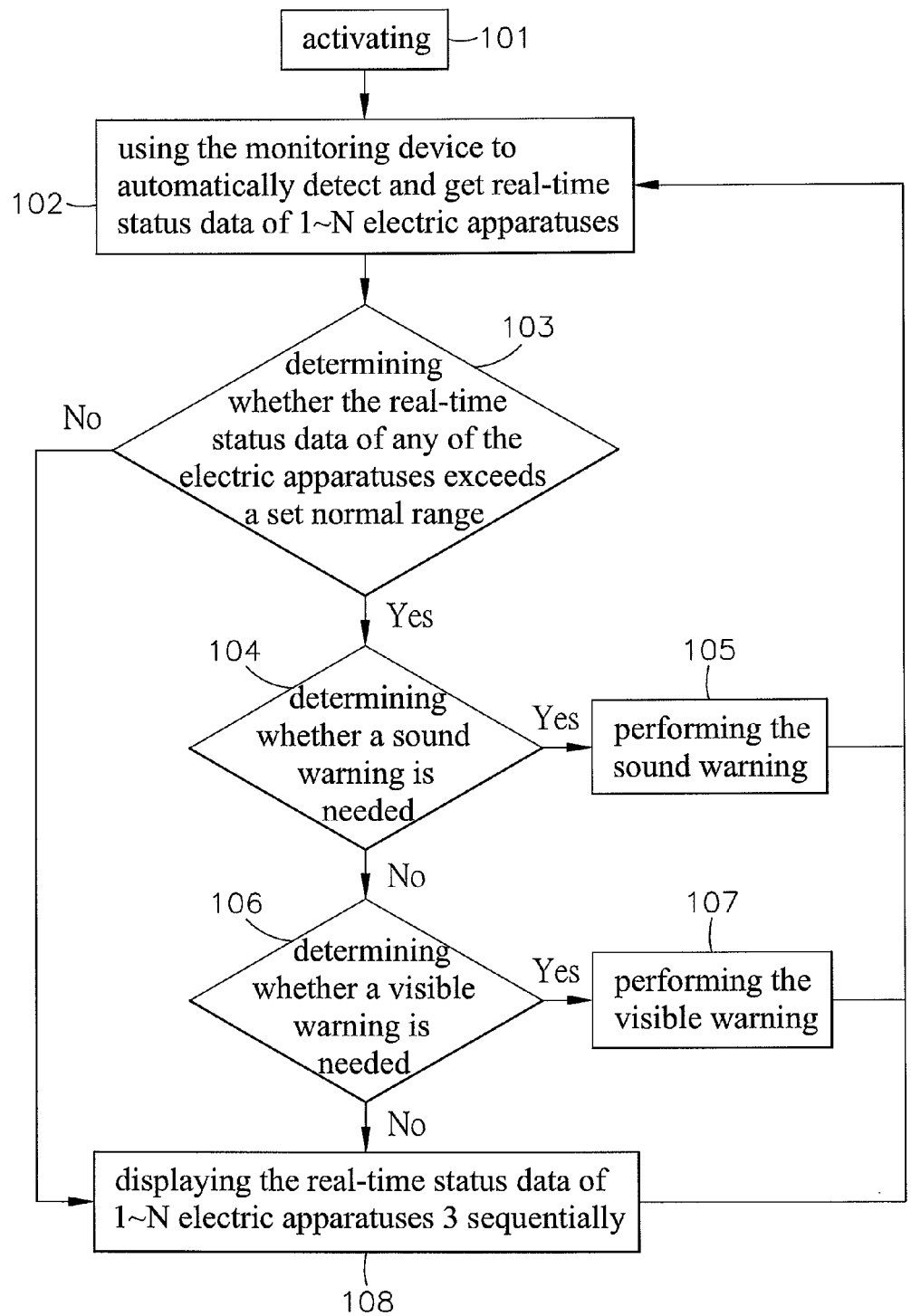
FIG. 6 is an operation flow diagram of automatically detecting the electric apparatus by the monitoring device of the present disclosure.
Figure 7:
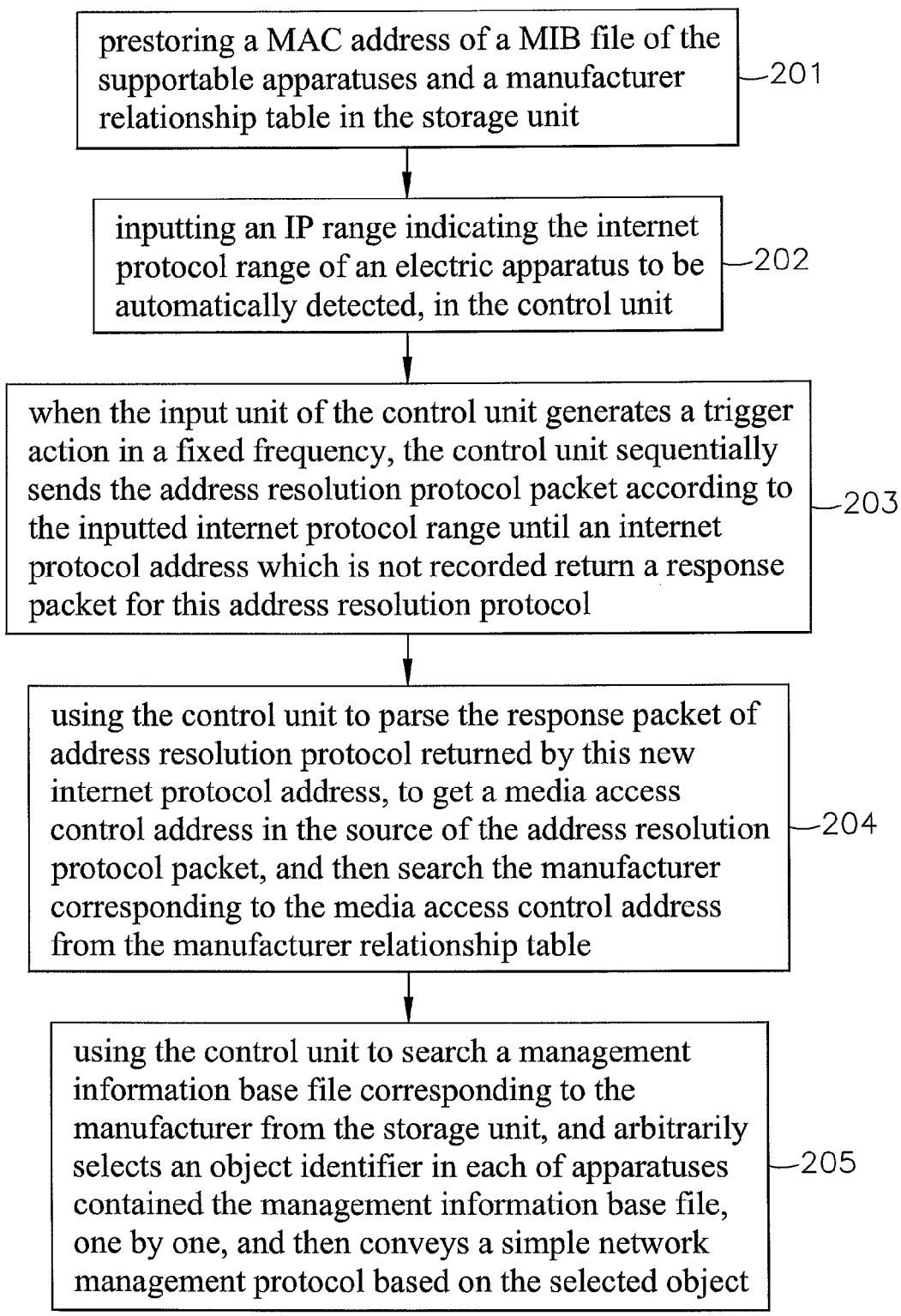
FIG. 7 is an operation flow diagram of monitoring and managing the electric apparatus by the monitoring device of the present disclosure.
Figure 8:
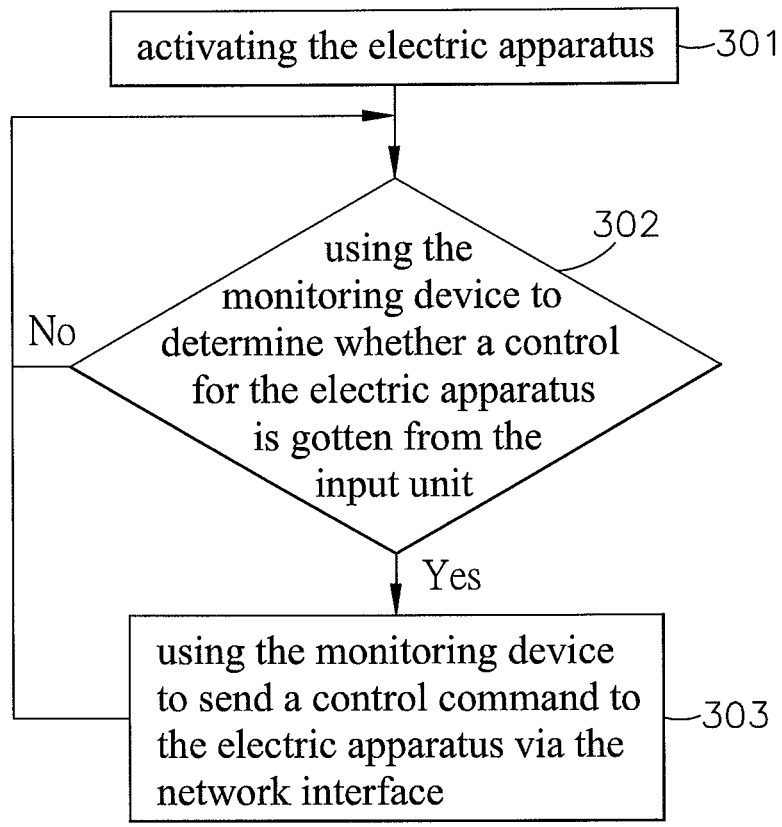
FIG. 8 is an operation flow diagram of controlling the electric apparatus by the monitoring device of the present disclosure.

Please refer to FIG. 6 through FIG. 8, which are operation flow diagram of automatically detecting the electric apparatus, operation flow diagram of monitoring and managing the electric apparatus, and operation flow diagram of using the monitoring device to control the electric apparatus. As shown in FIGS., by using the monitoring method of the cabinet type on-site monitoring device of the present disclosure, the monitoring module 12 of the monitoring device 1 can automatically detect the electric apparatus 3 to be managed inside the cabinet 2 via local area network (such as Ethernet) for monitoring, and the monitoring method is implemented according to following steps:

Step (101): activating the electric apparatus 3.

Step (102): using the monitoring device 1 to automatically detect and get real-time status data of 1~N electric apparatuses 3.

Step (103): determining whether the real-time status data 3 of any of the electric apparatuses exceeds a set normal range, if yes, proceeding to step (104); if no, proceeding to (108).

Step (104): determining whether a sound warning is needed, if yes, proceeding to step (105); if no, proceeding to step (106).

Step (105): performing the sound warning, and repeating step (102).

Step (106): determining whether a visible warning is needed, if yes, proceeding to step (107); if no, proceeding to step (108).

Step (107): performing the visible warning, and repeating step (102).

Step (108): displaying the real-time status data of 1~N electric apparatuses 3 sequentially, and repeating step (102).

According to the aforesaid steps, it is clear that when the monitoring method of the cabinet type on-site monitoring device of the present disclosure is used, the control unit 121 of the monitoring module 12 of the monitoring device 1 can perform automatic detection and search, in cooperation with the predetermined data stored in the storage unit 123, via the network interface 122, to get the real-time status data of 1~N electric apparatuses 3. When determining that the real-time status data of any of the electric apparatus 3 exceeds the setting normal range, the control unit 121 determines whether the sound warning is needed, if yes, the control unit 121 controls the sound output unit 124 to broadcast a voice or sound corresponding to the predetermined data stored in the storage unit 123; if no, the control unit 121 determines whether the sound warning is needed, if yes, the control unit 121 controls the display module 125 to display data, pattern (such as letter, symbol, etc.) or light signal corresponding to the predetermined data stored in the storage unit 123. After the sound output unit 124 or the display module 125 completes the sound or visible warning action, the step (102) is repeated to perform the automatic detection and search to get the real-time status data of the 1~N electric apparatuses 3. When determining the real-time status data of the electric apparatuses 3 does not exceed the setting normal range and the sound and visible warning action are not needed, the control unit 121 can control the display module 125 to display the real-time status data of the 1~N electric apparatuses 3 sequentially.

The monitoring module 12 of the monitoring device 1 of the present disclosure can automatically detect and search each of electric apparatuses 3 installed inside the cabinet 2, to get the real-time status data of the electric apparatuses 3, and to directly perform sound or visible warning action by the sound output unit 124 or the display module 125, so that the manager can on-site watch the display information on the display module 125 via the window 221 of the cabinet door 22 to check the current operation status of each of electric apparatuses 3, it means that the manager can on-site monitor different electric apparatuses 3, and the convenience and flexibility of on-site management for manager can be increased, and the electric apparatuses 3 can be kept operating more efficiently.

However, the step (102) of using the monitoring device 1 to automatically detect the electric apparatus 3 being managed further includes following steps:

Step (201): prestoring a media access control (MAC) address of a management information base (MIB) file of the supportable apparatuses and a manufacturer relationship table in the storage unit 123.

Step (202): inputting an internet protocol (IP) range indicating the internet protocol range of an electric apparatus 3 to be automatically detected, in the control unit 121.

Step (203): when the input unit 126 of the control unit 121 generates a trigger action in a fixed frequency, the control unit 121 sequentially sends the address resolution protocol packet according to the inputted internet protocol range until an internet protocol address which is not recorded return a response packet for this address resolution protocol.

Step (204): using the control unit 121 to parse the response packet of address resolution protocol returned by this new internet protocol address, to get a media access control address in the source of the address resolution protocol packet, and then search the manufacturer corresponding to the media access control address from the manufacturer relationship table.

Step (205): using the control unit 121 to search a management information base file corresponding to the manufacturer from the storage unit 123, and arbitrarily selects an object identifier in each of apparatuses contained the management information base file, one by one, and then conveys a simple network management protocol based on the selected object identifier to the electric apparatus 3 on this internet protocol address for getting packet. After the electric apparatus 3 responses, the electric apparatus 3 is determined to be a kind of the apparatus of the manufacturer, and this internet protocol address is recorded.

According to the aforesaid steps, it is clear that a MAC address of MIB file of supportable apparatus, a manufacturer relationship table and the predetermined data are prestored in the storage unit 123 of the monitoring module 12 of the monitoring device 1 of the present disclosure. When the manager touches the input unit 126, the control unit 121 is inputted an IP range by the input unit 126, and the inputted IP range indicates the IP range of the electric apparatus 3 to be automatically detected.

When the input unit 126 of the control unit 121 generates a trigger action in a fixed frequency, the control unit 121 sequentially converts the inputted internet protocol (such as IP=192.168.26.81 . . . ) stored in the storage unit 123 into an MAC address (such as hexadecimal: C0. A8. 1A. 51, . . . ). After the format is encoded, the address resolution protocol (ARP) packet is sent to each of electric apparatuses 3 until an electric apparatus 3 at an internet protocol address not recorded returns a response packet for this address resolution protocol packet, and the control unit 121 then parses the address resolution protocol response packet returned from the new internet protocol address, to get the first three codes (such as 00-0C-15, . . . ) of the sender hardware address in the source of the address resolution protocol packet, for the corresponding electric apparatus 3. The control unit 121 then searches the corresponding manufacturer from the media access control address and the manufacturer relationship table prestored in the storage unit 123, for example, the manufacturer corresponding to code "00-0C-15" is Cyper-Power Systems. The control unit 121 then searches all management information base files corresponding to the manufacturer from the storage unit 123, and selects an object identifier (OID) of each of apparatus from the management information base files one by one, and conveys a packet, which is provided by the simple network management protocol for getting service, to the electric apparatus 3 at the internet protocol address. For example, an object identifier is selected from each of apparatus (such as USB/eSwitch/ePDU/Environment Sensor, etc.) data folders in the management information base file. If the object identifier is selected form the Environment Sensor data folder, the identify name of content of the object identifier can be 1.3.6.1.4.1.3808.1.1.4.1.1, and the packet provided by the simple network management protocol for getting service is conveyed to the electric apparatus 3 at the internet protocol address until the control unit 121 get response from the response packet returned by the corresponding electric apparatus 3, and the control unit 121 can determine the electric apparatus 3 to be a kind of apparatus produced by the manufacturer, and record this internet protocol address.

The monitoring device 1 of the present disclosure can provide single interface to the manager, and the extra computer or the control apparatus is not required to incorporate between the electric apparatuses 3 and the monitoring device 1, that is, the local area network can be used as an interface of data transmission and communication, so the inconvenience in the integrated management for the manager to set the electric apparatus 3 to be added into management can be avoided. In addition, complicated wiring and connection operation is not required after the electric apparatus 3 is installed inside the cabinet 2, so it is not necessary to buy a new monitoring device 1 for automatically detecting and searching real-time status data of different electric apparatuses 3 for on-site monitoring even if the electric apparatus 3 is upgraded or a new electric apparatus 3 is added.

However, the step where the monitoring module 12 controls the electric apparatus 3 at the internet protocol address, further includes following steps:

Step (301): activating the electric apparatus 3.

Step (302): using the monitoring device 1 to determine whether a control for the electric apparatus 3 is gotten from the input unit 126, if yes, proceeding to step (303); if no, proceeding to step (302).

Step (303): using the monitoring device 1 to send a control command to the electric apparatus 3 via the network interface 122, and proceeding step (302).

According to the aforesaid steps, it is clear that the input unit 126 of the monitoring module 12 of the monitoring device 1 can provide the manager to touch to generate and output a control signal to the control unit 121, when the control unit 121 determines to get the instruction from the input unit 126 for conveying the control action to the electric apparatus 3, the control unit 121 then sends the control command to the electric apparatus 3 via the network interface 122, so the manager can on-site operate related setting or control function for the electric apparatuses 3 via the input unit 126, so the whole operation is more direct and convenient.

Therefore, the present disclosure directs to the monitoring device 1 equipped with a monitoring module 12 inside a main body 11 thereof and a positioning mechanism 112 outside the main body 11 thereof; the monitoring module 12 can automatically detect the electric apparatus 3 installed inside a cabinet 2 for monitoring, and the main body 11 can be combined on a casing structure 21 of the cabinet 2, or the casing structure 21 is movably pivoted on a cabinet door 22 by using a positioning component (not shown in FIGS.) to insert the plurality of hang holes 1121 of the positioning mechanism 112 or the through hole 1123 on a support 1122. Therefore, the manager can watch the monitoring device 1 via the window 221 to check the current operation status of respective electric apparatus 3 without opening the cabinet door 22, and automatically detect, search and get the real-time status data of the electric apparatus 3 by the monitoring module 12 via local area network. A sound or visible warning action is performed when the monitoring module 12 determines the real-time status data of any of electric apparatuses 3 exceeding a setting normal range. The monitoring device 1 can provide the manager a single interface for on-site monitoring different electric apparatus 3, so as to increase convenience of on-site real-time management by a manager, and the product can be more competitive.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A cabinet type on-site monitoring device, comprising:
    a monitoring device, equipped with a monitoring module inside a main body thereof and a positioning mechanism at the outside of said main body thereof, said monitoring module having a control unit, a network interface, a storage unit, a sound output unit, a display module, and an input unit, and configured for automatically detecting a predetermined electric apparatus for monitoring, and said positioning mechanism having a plurality of hang holes and at least one L-shaped support disposed on the main body for combining with a predetermined cabinet, wherein:
        a said network interface is connected to said predetermined electric apparatus for said control unit to automatically detect said predetermined electric apparatus to get real-time status data via said network interface;
        said control unit is connected to said sound output unit and said display module which perform a warning action when said control unit determines said real-time status data of said predetermined electric apparatus exceeding a setting range;
        said storage unit is connected to the control unit and prestores a media access control address of a management information base file of multiple supportable electric apparatuses including said predetermined electric apparatus, and a manufacturer relationship table;
        said input unit is connected to the control unit and is used to input an internet protocol range indicating an electric apparatus internet protocol range to be automatically detected by said control unit, and touched to generate and output a control signal to said control unit for sending a control command to said predetermined electric apparatus; and
        when said input unit generates a trigger action in a fixed frequency, said control unit sequentially sends an address resolution protocol packet according to said inputted internet protocol range until an internet protocol address which is not recorded returns a response packet for said address resolution protocol packet, parses said response packet for said address resolution protocol packet returned by said new internet protocol address, gets a media access control address in a source of said media access control address from said manufacturer relationship table, searches one of said management information base files corresponding to a manufacturer from said storage unit, arbitrarily selects an object identifier in said predetermined electric apparatus contained in said management information base file, and conveys a simple network management protocol based on said selected object identifier to said predetermined electric apparatus on said internet protocol address for getting packet, wherein after said predetermined electric apparatus responds, said predetermined electric apparatus is determined to be a kind of electric apparatus of said manufacturer, and said internet protocol address is recorded.

2. The cabinet type on-site monitoring device as claimed in claim 1, wherein said main body is equipped with a panel at the outside thereof.

3. The cabinet type on-site monitoring device as claimed in claim 1, wherein said control unit of said monitoring module of said monitoring device is a micro controller, CPU, or a processor, and said storage unit is an EEPROM or a flash memory.

4. The cabinet type on-site monitoring device as claimed in claim 1, wherein said sound output unit of said monitoring module of said monitoring device is a buzzer or a loudspeaker, and said display module comprises at least one light emitting diode or a liquid crystal displayer.

5. The cabinet type on-site monitoring device as claimed in claim 1, wherein said input unit of said monitoring module of said monitoring device is a touch control panel or a plurality of buttons.

6. A cabinet type on-site monitoring device, comprising a monitoring device and a cabinet, wherein a monitoring module is equipped inside a main body of said monitoring device to automatically detect a predetermined electric apparatus for monitoring and has a control unit, a network interface, a storage unit, a sound output unit, a display unit and an input unit, a positioning mechanism is provided at the outside of said main body for being combined with said cabinet and has a plurality of hang holes and at least one L-shaped support disposed on the main body for combining with said cabinet, and said cabinet has a casing structure and a cabinet door movably pivoted on said casing structure, and an accommodating space is formed inside said cabinet for installing said at least one predetermined electric apparatus, wherein said cabinet door has a window, said at least one L-shaped support has a through hole, said main body of said monitoring device is placed inside said casing structure of said cabinet or is disposed on an inner wall of said cabinet door by using said plurality of hang holes or said at least one L-shaped support of said positioning mechanism and fasteners for said window of said cabinet door to correspond to a display module of said monitoring device after said cabinet door is closed,
    wherein:
        said network interface is connected to said predetermined electric apparatus for said control unit to automatically detect said predetermined electric apparatus to get real-time status via said network interface;
        said control unit is connected to said sound output unit and said display module which perform a warning action when said control unit determines said real-time status data of said predetermined electric apparatus exceeding a setting range;

said storage unit is connected to the control unit and prestores a media access control address of a management information base file of multiple supportable electric apparatuses including said predetermined electric apparatus, and a manufacturer relationship table;

said input unit is connected to the control unit and is used to input an internet protocol range indicating an electric apparatus internet protocol range to be automatically detected by said control unit, and touched to generate and output a control signal to said control unit for sending a control command to said predetermined electric apparatus; and when said input unit generates a trigger action in a fixed frequency, said control unit sequentially sends an address resolution protocol packet according to said inputted internet protocol range until an internet protocol address which is not recorded returns a response packet for said address solution protocol packet, parses said response packet for said address resolution protocol packet returned by said new internet protocol address, gets a media access control address in a source of said media access control address from said manufacturer relationship table, searches one of said management information base files corresponding to a manufacturer from said storage unit, arbitrarily selects an object identifier in said predetermined electric apparatus contained in said management information base file, and conveys a simple network management protocol based on said selected object identifier to said predetermined electric apparatus on said internet protocol address for getting packet, wherein after said predetermined electric apparatus responds, said predetermined electric apparatus is determined to be a kind of electric apparatus of said manufacturer, and said internet protocol address is recorded.

7. The cabinet type on-site monitoring device as claimed in claim 6, wherein said main body of said monitoring device is equipped with a panel at the outside thereof.

8. The cabinet type on-site monitoring device as claimed in claim 6, wherein a plurality of positioning spaces for installing said monitoring device and said predetermined electric apparatus are formed inside said casing structure of said cabinet by using a plurality of clapboards to separate said accommodating space.

9. A monitoring method of a cabinet type on-site monitoring device, adapted for a cabinet, wherein a monitoring device and an electric apparatus are installed inside said cabinet, and a monitoring module having a control unit is disposed inside a main body of said monitoring device, and said control unit has a network interface for said control unit to automatically detect said predetermined electric apparatus to get real-time status data and stores predetermined data, and said control unit respectively is connected to a sound output unit and a display module which perform a warning action when said control unit determines said real-time status data of said predetermined electric apparatus exceeding a setting range, and an input unit which can be touched to generate and output a control signal to said control unit for sending a control command to said predetermined electric apparatus, to implement following steps:

(a1) activating said predetermined electric apparatus;
(a2) using said monitoring device to automatically detect and get real-time status data of 1~N electric apparatuses;
(a3) determining whether said real-time status data of any of said electric apparatuses exceeds a set normal range, if yes, proceeding to step (a4); if no, proceeding to (a8);
(a4) determining whether a sound warning is needed, if yes, proceeding to step (a5); if no, proceeding to step (a6);
(a5) performing said sound warning, and repeating step (a2);
(a6) determining whether a visible warning is needed, if yes, proceeding to step (a7); if no, proceeding to step (a8);
(a7) performing said visible warning, and repeating step (a2); and
(a8) displaying said real-time status data of 1~N electric apparatuses sequentially, and repeating step (a2), wherein the said step (a2) further comprises following steps:
(b1) prestoring a media access control address of a management information base file of each supportable apparatus and a manufacturer relationship table in said storage unit;
(b2) inputting an internet protocol range indicating an electric apparatus internet protocol range to be automatically detected, in said control unit;
(b3) when said input unit of said control unit generates a trigger action in a fixed frequency, said control unit sequentially sends a address resolution protocol packet according to said inputted internet protocol range until an internet protocol address which is not recorded returns a response packet for said address resolution protocol packet;
(b4) using said control unit to parse said response packet for said address resolution protocol packet returned by said new internet protocol address, to get a media access control address in a source of said address resolution protocol packet, and then to search said manufacturer corresponding to said media access control address from said manufacturer relationship table; and
(b5) using said control unit to search one of the management information base files corresponding to said manufacturer from said storage unit, and arbitrarily select an object identifier in each electric apparatus contained in said management information base file, one by one, and then convey a simple network management protocol based on said selected object identifier to said electric apparatus on said internet protocol address for getting packet, wherein after said electric apparatus responds, said electric apparatus is determined to be a kind of said apparatus of said manufacturer, and said internet protocol address is recorded.

10. The monitoring method of the cabinet type on-site monitoring device as claimed in claim 9, wherein said step of using said monitoring module to control said electric apparatus at said internet protocol address, further comprises following steps:

(c1) activating said predetermined electric apparatus;
(c2) using said monitoring device to determine whether a control signal for said electric apparatus is gotten from said input unit, if yes, proceeding to step (c3); if no, proceeding to step (c2); and
(c3) using said monitoring device to send a control command to said electric apparatus via said network interface, and repeating step (c2).

* * * * *